C. A. ENTORF.
WATER SEPARATING FILTER FOR GASOLENE.
APPLICATION FILED OCT. 3, 1912.
1,081,030.
Patented Dec. 9, 1913.
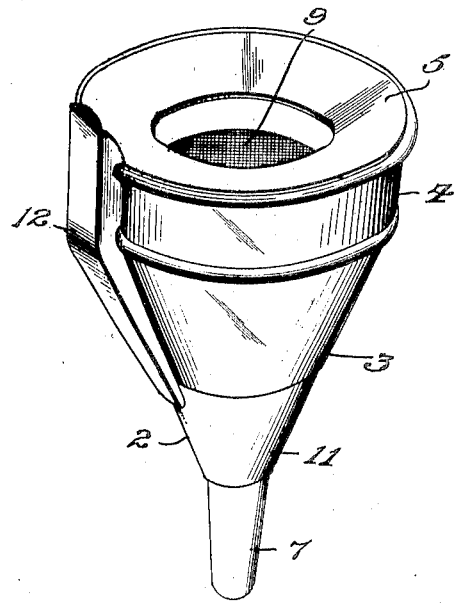
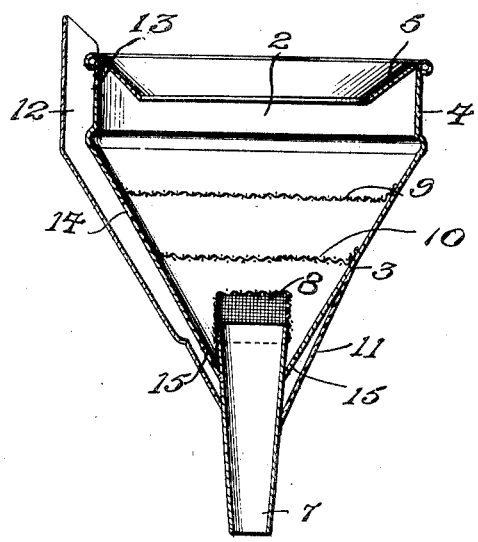
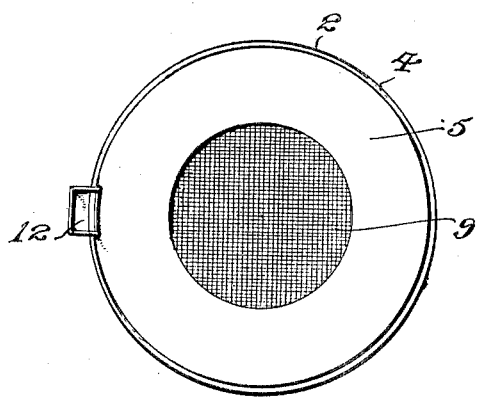
Inventor
C. A. Entorf.

UNITED STATES PATENT OFFICE.

CHARLES A. ENTORF, OF AMBOY, ILLINOIS, ASSIGNOR TO ENTORF FILTER COMPANY, OF AMBOY, ILLINOIS.

WATER-SEPARATING FILTER FOR GASOLENE.

1,081,030.   Specification of Letters Patent.   Patented Dec. 9, 1913.

Application filed October 3, 1912. Serial No. 723,803.

*To all whom it may concern:*

Be it known that I, CHARLES A. ENTORF, citizen of the United States, residing at Amboy, in the county of Lee and State of Illinois, have invented certain new and useful Improvements in Water-Separating Filters for Gasolene, of which the following is a specification.

My invention relates to filters and particularly to filters for filtering gasolene, naphtha and similar liquids.

The primary object of my invention is to provide a filter whereby water may be separated from gasolene or like liquids when it is being poured through the filter.

A further object of the invention is to provide a filter, the body of which has a plurality of openings at various levels leading into a collecting duct whereby the water which may have accumulated in the filter at various levels may leave and separate from the gasolene.

A further object is to provide a construction of this character with a plurality of fine meshed filtering screens, which will act to detain the water above the screens and to provide in connection with these screens a water duct having openings leading into the filter below the screens whereby any water which may pass through the screens will pass out into the water duct and may be separately discharged.

Other objects will appear in the course of the following description.

My invention is illustrated in the accompanying drawings wherein:

Figure 1 is a perspective view of my improved filter. Fig. 2 is a vertical diametrical section, the section being taken through the duct 12. Fig. 3 is a plan view of the same.

Corresponding and like parts are referred to in the following description and illustrated in all the views of the accompanying drawings by the same reference characters.

As illustrated the body of the filter is formed by a funnel-shaped receptacle designated generally 2. This receptacle has a downwardly converging conical side wall 3 which at its upper end merges into a vertical wall 4. This vertical wall at its upper end is formed with a bead and integral with this bead is a downwardly and inwardly extending, nearly annular splasher 5.

Projecting through the lower end of the conical portion 3 is a tubular discharge duct 7. It will be noted from Fig. 2 that this discharge duct extends upward above the lower end of the conical portion 3 for a purpose that will be later explained, the upper end of the discharge duct being screened by a cap 8 preferably formed of fine meshed wire gauze. Disposed at intervals across the conical portion of the filter are a plurality of fine meshed wire gauze screens designated 9 and 10 respectively.

Formed at the lower end of the body of the filter is a water collecting chamber designated 11 which is also conical in form and is fastened at its upper edge to the face of the conical portion 3 and soldered or otherwise fastened at its lower edge to the outer face of the duct 7. Extending down one side of the body 2 is a water receiving duct 12 forming a drain and vent pipe. This duct extends above the upper end of the body 2 and at its lower end opens into the chamber 11 so that the member 12 practically forms a duct leading from the chamber 11. This duct 12 communicates with the interior of the body 2 at a plurality of points by means of perforations 13, 14 and 15. The perforation 13 is disposed just below the beaded upper edge of the body 2, the perforation 14 is disposed just below the screen 9 while the perforations 15 are disposed at the lower end of the conical portion 3, that is, below the upper end of the duct 7.

The operation of the invention is as follows: When gasolene, naphtha or like fluids which contain water are poured into the filter, the gasolene will pass through the wire gauze screens 9 and 10. As soon, however, as the wire gauze 9 is wet with kerosene or gasolene, it is nearly impossible to get any water through it, and the same, of course, applies to the wire gauze 10. Any water which may pass through the screen 9, however, but not pass through the screen 10 will pass into the duct through the opening 14. If, however, any water passes through the screens 9 and 10 into the space below the screen 10, the water being so much heavier than the kerosene or gasolene will fall to the bottom of the conical portion 3 and will pass into the reservoir 11 by way of the perforations 15. It will be noted that the tube or duct 7 extends far enough above the openings 15 so that no heavy liquids will reach the screen 8 and so that only the gasolene will pass through the screen and the water and other heavy liquids will pass out through the perforation 13. After the gasolene has been passed through the filter, the water collecting chamber 11 may be emptied by simply tipping the filter to the side on which the drain or vent pipe is located and everything that is in the filter reservoir will pass off through the drain or vent pipe 12 and any water that may be caught in the upper portion of the filter will pass out through the opening 13 or be caught in the projecting portion of the drain pipe.

While I have illustrated what I believe to be a thoroughly effective form of my invention, it will of course be understood that it might be modified in many ways without departing from the spirit of the invention, and that it may be made in various sizes and shapes as will best accommodate it to any special work to be done.

What I claim is:

1. A filter of the character described including a hollow body, a discharge pipe leading from the hollow body and having its inlet opening disposed above the bottom of said body, a plurality of filter screens extending horizontally across the hollow body, the inlet end of the discharge pipe being also provided with a filtering screen, and a receiving duct forming a drainage passage and communicating with the hollow body at the bottom thereof below the level of the inlet end of the discharge pipe and with the hollow body above each screen of the series.

2. A filter of the character described including a hollow body, a discharge pipe leading from the hollow body and extending above the bottom thereof, a plurality of filtering screens extending horizontally across the hollow body, the upper end of the discharge pipe being also provided with a filtering screen, and a water duct forming a drainage passage and communicating with the hollow body at the bottom thereof below the level of the upper end of the discharge pipe and with the hollow body immediately below the first screen of the series and near the upper end of the hollow body.

3. A filter of the character described including a hollow tapering body, a discharge pipe leading from the small end of the hollow body and having its inlet opening disposed above the bottom of said body, a transverse, horizontally arranged, finely reticulated filtering screen disposed within the body, and a receiving chamber carried at one side of the hollow body, said chamber having an opening leading into the interior of the hollow body and said opening being spaced a distance above said screen, said chamber also having an opening leading into the body below the upper end of the discharge pipe.

4. A filter of the character described comprising a hollow body, a pair of filtering screens arranged in superposed relation, a discharge pipe leading from the hollow body and extending above the bottom of the same, a filtering screen extending across the upper end of the discharge pipe, a water collecting chamber formed below the hollow body and communicating with the same below the upper end of the discharge pipe, and a duct forming a passage and extending from the water collecting chamber along the side of the hollow body and above the same and having an opening into the hollow body immediately below the first screen of the pair and also having an opening into the hollow body near the top thereof.

5. A filter of the character described comprising a conical receiver having vertical upper walls, a discharge pipe entering the bottom of the conical receiver and projecting above the same, a cap of filtering material covering the top of the discharge pipe, a water collecting chamber surrounding the discharge pipe and disposed at the lower end of the conical receiver, said chamber communicating with the interior of the receiver at a point below the upper end of the discharge pipe, and a water duct leading from the collecting chamber and attached to the walls of the receiver and open at its upper end, and upper and lower filtering screens arranged within the conical portion of the receiver and in spaced relation to each other, the wall of the receiver having an opening at its upper end leading into the upper portion of the duct, and an opening disposed below the first screen of the series leading into said duct.

6. A filter of the character described comprising a circular body having a conical lower portion and having an inwardly extending splasher flange at its upper end, a discharge pipe projecting into the receiver at the lower end thereof and extending above the bottom of the receiver, a filtering cap attached to the upper end of the discharge pipe, a water receiving chamber attached to the lower end of the receiver and surrounding the discharge pipe, the wall of the receiver being perforated at its lower end below the discharge pipe leading into said water receiver, an upper and a lower screen disposed within the conical portion of the receiver in spaced relation to each other, and a duct leading from said water receiving chamber upward along the sides of the filter and open at its upper end, said duct having openings leading into the interior of the receiver, one of said openings being located at the upper end of the receiver and the other immediately below the first screen, the upper end of the receiver being disposed at the cutaway portion of the splasher flange.

7. A filter of the character described comprising a hollow downwardly tapering body, a discharge pipe entering the lower end of the hollow body and concentric with the longitudinal axis thereof, the upper end of the discharge pipe being disposed above the lower end of the hollow body, a filtering screen forming a cap closing the upper end of the discharge pipe, a plurality of filtering screens extending horizontally across the hollow body in spaced relation to each other, a receiving and collecting duct carried by the hollow body and open at its outer end, said duct having openings leading into the hollow body, said openings being disposed above each of said screens.

In testimony whereof I affix my signature in presence of two witnesses.

CHARLES A. ENTORF. [L. S.]

Witnesses:
J. M. EGAN, Jr.,
M. V. CRUSE.